US008207502B2

(12) United States Patent
Yang et al.

(10) Patent No.: US 8,207,502 B2
(45) Date of Patent: Jun. 26, 2012

(54) ON-BOARD RELOCATABLE VEHICLE INSPECTION SYSTEM HAVING RAMP-PLATFORM DEVICE

(75) Inventors: Zhongrong Yang, Beijing (CN); Hui Meng, Beijing (CN); Nan Jiang, Beijing (CN); Shangmin Sun, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 13/179,769

(22) Filed: Jul. 11, 2011

(65) Prior Publication Data

US 2011/0266447 A1 Nov. 3, 2011

Related U.S. Application Data

(62) Division of application No. 11/870,755, filed on Oct. 11, 2007, now Pat. No. 8,060,965.

(30) Foreign Application Priority Data

Oct. 13, 2006 (CN) .......................... 2006 1 0113720

(51) Int. Cl.
*B60P 3/06* (2006.01)

(52) U.S. Cl. .................................. 250/360.1; 250/358.1

(58) Field of Classification Search ................ 250/360.1
See application file for complete search history.

(56) References Cited

U.S. PATENT DOCUMENTS

| | | | | |
|---|---|---|---|---|
| 2,420,130 | A | 5/1947 | Foss | 254/88 |
| 3,178,156 | A | 4/1965 | Rigers | 254/88 |
| 3,190,395 | A | 6/1965 | Lill | 254/88 |
| 3,820,912 | A | 6/1974 | Hughes | 404/35 |
| 4,697,294 | A | 10/1987 | Schafer | 14/69.5 |
| 4,819,910 | A | 4/1989 | Johnston | 254/88 |
| 5,517,708 | A | 5/1996 | Baranowski | 14/69.5 |
| D370,717 | S | 6/1996 | Ziaylek et al. | D23/266 |

(Continued)

FOREIGN PATENT DOCUMENTS

AU 525 177 5/1978

(Continued)

OTHER PUBLICATIONS

Office Action for U.S. Appl. No. 11/870,755, dated Jun. 14, 2010, 10 pgs.

(Continued)

*Primary Examiner* — David Porta
*Assistant Examiner* — Djura Malevic
(74) *Attorney, Agent, or Firm* — Westman, Champlin & Kelly, P.A.

(57) ABSTRACT

Disclosed is a relocatable vehicle inspection system. The relocatable vehicle inspection system includes a radiation source for radiating radials; a detection array for receiving the radials from the radiation source, so that an image of the cargo on the vehicle to be inspected may be obtained; a moving device on which the radiation source and the detection array are disposed; and a ramp-platform device. The ramp-platform device includes first and second intermediate parts (6*a*, 6*b*); first, second, third and fourth ramp parts (4*a*1, 4*a*2, 4*b*1, 4*b*2); first, second, third and fourth transitional parts (5*a*1, 5*a*2, 5*b*1, 5*b*2). The first and second transitional parts can be foldably or removably connected to the first intermediate part, and the third and fourth transitional parts can be foldably or removably connected to the second intermediate part. The said ramp-platform device can be placed onto or removed away from the moving device under disassembling and folding conditions.

10 Claims, 3 Drawing Sheets

U.S. PATENT DOCUMENTS

| | | | | |
|---|---|---|---|---|
| 5,638,420 | A * | 6/1997 | Armistead | 378/57 |
| 5,640,821 | A | 6/1997 | Koch | 52/698 |
| D390,621 | S | 2/1998 | Cosentino | D21/817 |
| D430,377 | S | 8/2000 | Collins | D34/32 |
| 6,135,420 | A | 10/2000 | Johnston et al. | 254/88 |
| 6,539,572 | B2 | 4/2003 | Ware | 14/69.5 |
| 6,542,580 | B1 * | 4/2003 | Carver et al. | 378/57 |
| 6,581,231 | B1 | 6/2003 | Allain et al. | 14/69.5 |
| 6,654,977 | B1 | 12/2003 | Chin | 14/69.5 |
| 6,718,588 | B1 | 4/2004 | Frederiksen | 14/69.5 |
| D500,113 | S | 12/2004 | Frey et al. | D21/817 |
| 6,837,657 | B2 * | 1/2005 | Li et al. | 410/65 |
| 6,878,881 | B1 | 4/2005 | Henry | 174/101 |
| D505,238 | S | 5/2005 | Robertson | D34/32 |
| 6,993,801 | B2 | 2/2006 | Marko et al. | 14/69.5 |
| 7,003,836 | B2 | 2/2006 | Berg | 14/69.5 |
| 7,059,814 | B2 * | 6/2006 | Su et al. | 410/65 |
| 7,073,777 | B2 | 7/2006 | Branstetter | 254/88 |
| 7,104,524 | B1 | 9/2006 | Hidding et al. | 254/88 |
| 7,316,043 | B2 | 1/2008 | Henblad et al. | 14/69.5 |
| 7,367,764 | B2 * | 5/2008 | Li et al. | 410/65 |
| 7,571,507 | B2 | 8/2009 | Holicki | 14/69.5 |
| 7,591,605 | B2 | 9/2009 | Jonasz et al. | 404/15 |
| 7,734,008 | B1 * | 6/2010 | Sanders et al. | 378/57 |
| 7,769,133 | B2 * | 8/2010 | Carver et al. | 378/57 |
| 7,957,506 | B2 * | 6/2011 | Smith | 378/57 |
| 7,991,113 | B2 * | 8/2011 | Carver et al. | 378/57 |
| 2003/0201394 | A1 * | 10/2003 | Peoples | 250/336.1 |
| 2004/0154111 | A1 | 8/2004 | Trask | 14/69.5 |
| 2004/0265083 | A1 * | 12/2004 | Johnson | 410/30 |
| 2005/0084357 | A1 * | 4/2005 | Su et al. | 410/65 |
| 2006/0284094 | A1 * | 12/2006 | Inbar | 250/359.1 |
| 2007/0126189 | A1 * | 6/2007 | Li et al. | 280/1 |
| 2008/0023631 | A1 * | 1/2008 | Majors et al. | 250/336.1 |
| 2008/0178400 | A1 | 7/2008 | Brown | 14/71.1 |

FOREIGN PATENT DOCUMENTS

| | | | |
|---|---|---|---|
| CN | 1407180 | | 4/2003 |
| CN | 2715148 | Y | 8/2005 |
| CN | 200320126640 | | 8/2005 |
| DE | 2 245 613 | | 3/1974 |
| DE | 202 16 309 | U1 | 3/2003 |
| EP | 0 399 124 | A1 | 7/1989 |
| EP | 1 635 169 | A1 | 9/2005 |
| GB | 389398 | | 3/1933 |
| JP | 38-14226 | | 8/1938 |
| JP | 53-85824 | U | 12/1951 |
| JP | 57-1737 | U | 6/1955 |
| JP | 63-50903 | U | 4/1988 |
| JP | 63-81907 | U | 5/1988 |
| JP | 4-169664 | | 6/1992 |
| JP | 3099045 | U | 10/2003 |
| JP | 2004-170393 | | 6/2004 |
| JP | 2008-111837 | | 5/2008 |
| RU | 44 608 | U1 | 11/2004 |
| WO | WO 2006/014165 | | 2/2006 |

OTHER PUBLICATIONS

Office Action from corresponding German U.S. Appl. No. 102007049427.2, dated Nov. 12, 2010, 5 pgs.

Chinese Office Action from corresponding Chinese Application No. CN200610113720.4, dated Oct. 16, 2009 along with its translation.

Russian Office Action from corresponding Russian Application No. RU 2007138005, dated Oct. 16, 2008 along with its translation.

An Office Action for related Japanese patent application 2007267038, dated Apr. 13, 2010.

* cited by examiner

ON-BOARD RELOCATABLE VEHICLE INSPECTION SYSTEM HAVING RAMP-PLATFORM DEVICE

CROSS-REFERENCE TO RELATED APPLICATION

The present application is a divisional of and claims priority of U.S. patent application Ser. No. 11/870,755, filed Oct. 11, 2007, which also claims priority of Chinese patent application Ser. No. 200610113720.4, filed Oct. 13, 2006, the content of which is hereby incorporated by reference in its entirety.

FIELD OF THE INVENTION

The present invention relates to a radiating imaging inspection system. More particularly, it relates to a ramp-platform device and an on-board relocatable vehicle inspection system having the same.

BACKGROUND OF THE INVENTION

An on-board relocatable container/vehicle inspection system is an inspection apparatus applied in the customs, airport, and railway system. The inspection system utilizes a radiating imaging principle to obtain a perspective image of cargoes inside a container or vehicle by scanning the container/vehicle to be inspected, without opening the container or vehicle, so as to perform the inspection to the container/vehicle.

The on-board relocatable container/vehicle inspection system in a conventional art typically is integrated onto a chassis vehicle (referred as scanning vehicle). The lowest scanning height of the scanning vehicle normally should be over 400 mm, and the scanning vehicle is primarily used for a container truck but a small vehicle with a lower chassis.

In order to inspect the chassis and wheels of the small vehicle, the upright boom of the detector and the radiation source are needed to lowered to a lower position. For example, an assembled movable lower target container inspection device disclosed in China Patent Application No. 2032126640.4 may have a wider scanning range and a lower scanning target. However, it has some disadvantages such as the structure is complicate and the cost is high.

SUMMARY OF THE INVENTION

Accordingly, in order to at least partially or entirely solve the problems existing in the conventional arts, the first aspect of present invention is to provide a ramp-platform device for an on-board relocatable small vehicle inspection system. When it is not in use, the ramp-platform device may be placed on the scanning vehicle in a disassembling and folding conditions, and when it is under inspection, the vehicle to be inspected is raised to a predetermined height by assembling and spreading the ramp-platform device, so that a chassis and wheels of the small vehicle may be entered into the scanning range to achieve the inspection of every part of the small vehicle.

According to the first aspect of the present invention, there is provided a ramp-platform device comprising: first and second intermediate parts, said first and second intermediate parts are disposed in parallel with each other; and first to fourth ramp parts with a substantially triangle shaped longitudinal section, wherein the first and second ramp parts and the third and fourth ramp parts are connected with two opposite ends of the first intermediate part and the second intermediate part through a removable or a foldable connection, and the height of the ramp top end of the first to the fourth ramp parts is substantially equal to the height of the first and second intermediate parts.

Furthermore, the ramp-platform device further includes first to fourth transitional parts, each of said first to fourth transitional parts has a slopping portion and a horizontal portion, the gradient of the slopping portion is equal to that of the first to fourth ramp parts, and the height of a bottom of the slopping portion is substantially equal to the height of the top end of the first to fourth ramp parts, and the height of the horizontal portion is substantially equal to that of the first and second intermediate parts, wherein the first to fourth transitional parts may be foldably connected between the first ramp part and the first intermediate part, the second ramp part and the second intermediate part, the third ramp part and the third intermediate part, and the fourth ramp part and the fourth intermediate part, respectively, and wherein, the first to fourth transitional parts are able to be folded onto the first and second intermediate parts, respectively.

Preferably, the ramp-platform device further includes a connection frame having a substantially rectangular shape, wherein, the first and second intermediate parts are provided on a first side and a second side of the connection frame in opposite to each other, respectively.

Preferably, the first and second intermediate parts can be foldably connected to the first side and the second side of the connection frame, so that the first and second intermediate parts are able to be turned over onto a top surface of the connection frame about a first and second upper edges, and the first and fourth transitional parts are able to be folded onto the first and second intermediate parts which have been turned over onto the top surface of the connection frame.

Alternatively, the ramp-platform device further comprises a connection frame having a substantially rectangular shape, wherein, the first and second intermediate parts are provided on a first side and a second side of the connection frame in opposite to each other, respectively.

Preferably, the first and second intermediate parts can be foldably connected to the first side and the second side of the connection frame.

Furthermore, the height of the first and second intermediate parts and the height of the connection frame are substantially the same, and the total width between the first and second intermediate parts are equal or less than the width of the connection frame, wherein the first and second intermediate are foldably connected with a first upper edge of the first side and a second upper edge of the second side of the connection frame, respectively, so that the first and second intermediate are able to be turned over onto the top surface of the connection frame about the first and second upper edges, and wherein the first to fourth ramp parts in the disassembling condition are able to be stacked onto the first intermediate part and the second intermediate part turned over onto the top surface of the connection frame.

Alternatively, the ramp-platform device further includes: first to fourth transitional parts, each of said first to fourth transitional parts has a slopping portion and a horizontal portion, the gradient of the slopping portion is equal to that of the first to fourth ramp parts, and the height of a bottom of the slopping portion is substantially equal to the height of the top end of the first to fourth ramp parts, and the height of the horizontal portion is substantially equal to the first and second intermediate parts, wherein the first to fourth transitional parts may be removably connected between the first ramp part and the first intermediate part, the second ramp part and the first intermediate part, the third ramp part and the second intermediate part, and the fourth ramp part and the second intermediate part, respectively, and wherein, the first to fourth transitional parts in the removable condition are able to be accommodated into an inner space defined in the connection frame.

Preferably, the first and second intermediate parts are connected with the first and second upper edges of the connection frame by a hinge.

Furthermore, the connection frame includes three partitions for partitioned the inner space of the connection frame into four subspaces, said subspaces are used for accommodating the disassembled first to fourth transitional parts separately.

Preferably, the ramp-platform device further includes: a fastener for fastening the first intermediate part turned over onto the top surface of the connection frame together with the first and second ramp parts stacked thereon, so as to prevent the first and second ramp parts from falling off from the first intermediate part, and fastening the second intermediate part turned over onto the top surface of the connection frame together with the third and fourth ramp parts stacked thereon, so as to prevent the third and fourth ramp parts from falling off from the second intermediate part, so that the ramp-platform device in the disassembling and folding conditions can be maintained as a whole.

Preferably, the removable connection is a swallow-tailed connection.

Furthermore, the first to fourth ramp parts, the first and second intermediate parts, the first to fourth transitional parts, and the connection frame are made of Al-alloy.

Preferably, the connection frame is provided with a hooking member for hoisting and loading said connection frame.

Furthermore, the hooking member may be a flying ring and substantially provided in a central position of the upper surface of the connection frame.

In addition, the fastener may be an elastic hook.

According to a second aspect of the present invention, there is provided a relocatable vehicle inspection system, comprising: a radiation source for radiating radials; a detection array for receiving the radials from the radiation source, so that an image of the cargo on the vehicle to be inspected is obtained; a moving device on which the radiation source and the detection array are disposed; and a ramp-platform device according to the first aspect of the present invention, said ramp-platform device is able to be placed onto or removed away from the moving device under disassembling and folding conditions.

Preferably, the relocatable vehicle inspection system further comprising a hoisting device provided on the moving device, for hoisting and loading the ramp-platform device onto or removing it away from the moving device.

According to an embodiment of the relocatable vehicle inspection system, the hoisting device includes a lifting device used for hoisting and lifting the ramp-platform device; a boom having one end hinged with a first support provided on the moving device and another end connected with the lifting device; an actuator having one end hinged with a second support provided on the moving device and another end hinged with a third support provided on the boom for driving the boom to swing, so that the ramp-platform device in the disassembling and folding conditions can be hoisted and loaded onto or removed from the moving inspection system.

Furthermore, the lifting device may be an electric hoist.

In addition, the actuator may be a hydraulic cylinder.

Preferably, the boom may be telescopic.

In addition, the boom also includes a bracket provided on the moving device for supporting the ramp-platform device.

Preferably, the actuator may be a hydraulic cylinder.

Preferably, the moving device includes a vehicle motor for providing power and a chassis frame connected with the vehicle motor, wherein the radiation source, the detection array, and the hoisting device are disposed on the chassis frame, and said ramp-platform device is able to be placed onto and removed from the chassis frame by the hoisting device in the disassembling and folding conditions.

According to several embodiments of the present invention, the ramp-platform device is constituted by a plurality of parts and can be disassembled and folded into a smaller size, it is easy to be disposed on the moving device (scanning vehicle) for transportation, at the mean while, the hoisting device is provided on the moving device, so that the ramp-platform device can be hoisted and loaded onto the moving device or removed from the moving device to the ground. It is possible to reduce the working strength for loading or unloading the ramp-platform device, and the whole ramp-platform device has an excellent practicability, and the scanning and inspection for the smaller vehicle can be securely guaranteed.

BRIEF DESCRIPTION OF THE DRAWINGS

These and/or other aspects and advantages will be become more readily and more apparent from the following description in conjunction with accompany drawings, in which.

DETAILED DESCRIPTION OF THE PREFERRED EMBODIMENTS

Figure 1:
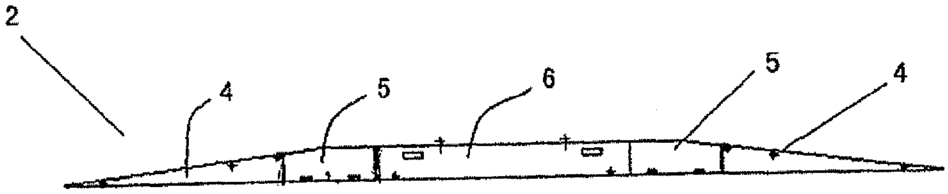
FIG. 1 is a front view of a ramp-platform device in an assembling and spreading conditions according to an embodiment of the present invention.

Preferred embodiments of the present invention will be described hereinafter in detail with reference to the attached drawings, wherein the like reference numerals refer to the like elements throughout the specification.

Next, a ramp-platform device 2 for an on-board relocatable small vehicle inspection system according to an embodiment of the present invention is described referred to FIG. 1 to 4.

Figure 2:
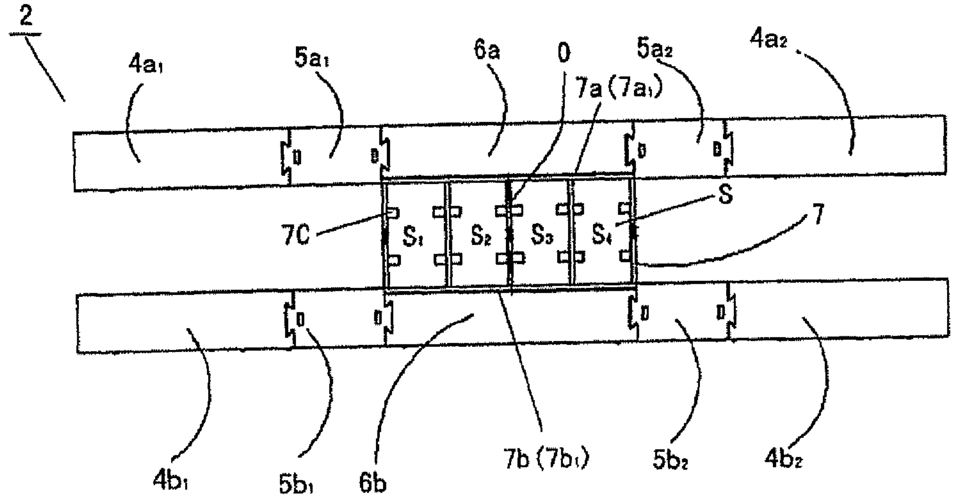
FIG. 2 is a top view of the ramp-platform device shown in FIG. 1.

As shown in FIGS. 1 and 2, the ramp-platform device 2 includes first to a fourth ramp parts **4*a*1, 4*a*2, 4*b*1, 4*b*2 having a substantially triangle shaped longitudinal section, first to fourth transitional parts 5*a*1, 5*a*2, 5*b*1, 5*b*2, first and second intermediate parts 6*a*, 6*b*, and a connection frame 7**.

The connection frame 7 has a substantially rectangular shape and an opened top surface. An inner space S is defined in the connection frame 7, the inner space S is partitioned into four subspaces S1-S4 by three partitions 0. The connection frame 7 as shown may be made in Al-alloy and have an advantage of light weight; however, the material of connection frame is not limited to the Al-alloy, and can be any other suitable materials.

Alternatively, inside the four subspaces S1-S4 partitioned by the partitions 0, a rack is provided for placing the first to fourth transitional parts 5*a*1, 5*a*2, 5*b*1, 5*b*2, respectively. Each of the racks is constituted by protuberances 7*c* provided in the subspaces, there are four protuberances 7*c* provided in each subspace in FIG. 2; however, there is no particular limitation for the number of the protuberances 7*c*, for example, it may be three or five.

The first and second intermediate parts 6*a*, 6*b* are symmetrically provided on a first side 7*a* and a second side 7*b* opposing to each other, respectively. Preferably, the first and the second intermediate parts 6*a*, 6*b* are foldably connected with a first and second upper edges 7*a*1, 7*b*1 of the first side 7*a* and the second side 7*b* of the connection frame 7 by such as a hinge 10, respectively, so that the first and second intermediate parts 6*a*, 6*b* are able to be turned to the top surface of the connection frame 7 about the first and second upper edges 7*a*1, 7*a*2. The height of the connection frame 7 is substantially equal to that of the first and the second intermediate parts 6*a*, 6*b*, and the total width between the first and the second intermediate parts 6*a*, 6*b* is less than the width of the connection frame 7. In a modified example of the present invention, the first and second intermediate parts 6*a*, 6*b* may be removably connected with the connection frame 7, respectively.

Preferably, the first and second intermediate parts 6*a*, 6*b* have rectangular shape, and are made of but not limited to Al-alloy. More preferably, the shape and the size of the first intermediate parts 6*a* and the second intermediate parts 6*b* are identical, so that the first intermediate parts 6*a* and the second intermediate parts 6*b* can be exchanged during the disassembling and assembling, thus, it is convenient for assembling and disassembling.

Referring to FIG. 2, in an preferred embodiment of the invention, each part of the first to fourth transitional parts 5*a*1, 5*a*2, 5*b*1, 5*b*2 includes a slopping portion and a horizontal portion. The horizontal portions of the first and second transitional parts 5*a*1, 5*a*2 are removably connected to both ends of the first intermediate part 6*a* by means of such as swallow-tailed connection, respectively, and the horizontal portions of the third and fourth transitional parts 5*b*1, 5*b*2 are removably connected to both ends of the second intermediate part 6*b* by means of such as the same swallow-tailed connection. The height of the horizontal portions of the first to fourth transitional parts 5*a*1, 5*a*2, 5*b*1, 5*b*2 is substantially equal to that of the first and second intermediate parts 6*a*, 6*b*.

Preferably, the shapes and sizes of the first to fourth transitional parts 5*a*1, 5*a*2, 5*b*1, 5*b*2 are identical so as to improve the convenience during assembling and disassembling. Furthermore, the first to fourth transitional parts 5*a*1, 5*a*2, 5*b*1, 5*b*2 are made in and not limited to Al-alloy.

Top ends of the ramps of the first to fourth ramp parts 4*a*1, 4*a*2, 4*b*1, 4*b*2 are removably connected with the slopping portion of the first to fourth transitional parts 5*a*1, 5*a*2, 5*b*1, 5*b*2 respectively, for example by means of a swallow-tailed connection. Alternatively, Top ends of the ramps of the first to fourth ramp parts 4*a*1, 4*a*2, 4*b*1, 4*b*2 can be foldably connected with the slopping portion of the first to fourth transitional parts 5*a*1, 5*a*2, 5*b*1, 5*b*2 respectively, for example by means of a hinge connection.

The gradients of the first to fourth ramp parts 4*a*1, 4*a*2, 4*b*1, 4*b*2 are substantially the same as the gradients of the first to the fourth transitional parts 5*a*1, 5*a*2, 5*b*1, 5*b*2, and the height of the top ends of the ramps of the first to fourth ramp parts 4*a*1, 4*a*2, 4*b*1, 4*b*2 is substantially as same as the heights of the lower ends of the slopping portions of the first to fourth transitional parts 5*a*1, 5*a*2, 5*b*1, 5*b*2, so that their slopping surfaces flush with each other when the first to fourth ramp parts 4*a*1, 4*a*2, 4*b*1, 4*b*2 are connected with the first to fourth transitional parts 5*a*1, 5*a*2, 5*b*1, 5*b*2.

Preferably, the longitudinal sections of the first to fourth ramp parts 4*a*1, 4*a*2, 4*b*1, 4*b*2 have substantially triangle shape and they have a size identical with each other so as to be exchanged with each other during the assembling and disassembling, thus, it is improved the convenience of assembling and disassembling. The first to fourth ramp parts 4*a*1, 4*a*2, 4*b*1, 4*b*2 may be made in and not limited to the Al-alloy.

In FIG. 2, swallow-tailed connection is employed between each ramp part and each corresponding transitional part as well as between each transitional part and corresponding intermediate part, and swallow-tailed protrusions are provided at both ends of each transitional part respectively, and corresponding ends of each ramp part and intermediate part are provided with swallow-tailed grooves. However, the position and configuration of the swallow-tailed protrusions and grooves constituting the swallow-tailed connection are not limited and can be modified as required.

Furthermore, it may be understood for those skilled in the art that frame 7 and the first to fourth transitional parts 5*a*1, 5*a*2, 5*b*1, 5*b*2 can be omitted from the ramp-platform device 2. Alternatively, the ramp-platform device 2 according to the present invention can be configured that the first to fourth ramp parts 4*a*1, 4*a*2, 4*b*1, 4*b*2 may be removably connected, for example by a swallow-tailed connection or foldably connected, for example by a hinge connection, at the both ends of the first intermediate part 6*a* and the both ends of the second intermediate part 6*b*. In such case, the height of the top ends of the first to fourth ramp parts 4*a*1, 4*a*2, 4*b*1, 4*b*2 is substantially equal to that of the both ends of the first intermediate part 6*a* and the second intermediate part 6*b*.

FIGS. 1 and 2 are a front view and a top view of the ramp-platform device 2 in the assembling condition and in the spreading condition, respectively. As shown in FIGS. 1 and 2, in the assembling and spreading conditions, the first and second intermediate parts 6*a*, 6*b* are foldably connected to the first and second upper edges 7*a*1, 7*b*1 of the connection frame 7 by a hinge 10, the first to fourth transitional parts 5*a*1, 5*a*2, 5*b*1, 5*b*2 are connected to both opposing ends of the first and second intermediate parts 6*a*, 6*b* by the swallow-tailed connection. Therefore, a vehicle to be inspected may be driven onto the assembled and spread ramp-platform device 2, so that the height of the vehicle to be inspect is raised, thus the inspection system can scan the chassis and wheels of the vehicle to be inspected, it is particularly advantageous for a small vehicle with a lower chassis. That is, the vehicle to be inspected is raised by using the ramp-platform device 2, i.e., for a small vehicle to be inspected with a lowered chassis, the inspection system can also be able to scan each parts of the vehicle to be inspect including the chassis and wheels.

As mentioned above, the connection between the first to fourth ramp parts 4*a*1, 4*a*2, 4*b*1, 4*b*2 and the first to fourth transitional parts 5*a*1, 5*a*2, 5*b*1, 5*b*2 and the connection between the first and second intermediate parts 6*a*, 6*b* and the first to fourth transitional parts 5*a*1, 5*a*2, 5*b*1, 5*b*2 may be alternatively connected by means of foldable connection, for example, by means of a hinge. Thus, when it is required that the ramp-platform device 2 changes from assembling and spreading mode to the folding mode for easy transportation, it is only needed that the first to fourth ramp parts 4*a*1, 4*a*2, 4*b*1, 4*b*2 and the first to fourth transitional parts 5*a*1, 5*a*2, 5*b*1, 5*b*2 are folded over the first and second intermediate parts 6*a*, 6*b* in order without taking apart the connection between each part, thus, the integrated ramp-platform device along a folding condition is achieved. More specifically, in an example of the present invention, firstly, the first to fourth ramp parts 4*a*1, 4*a*2, 4*b*1, 4*b*2 are folded onto the first and second intermediate parts 6*a*, 6*b* about a first folding direction. Secondly, the first to fourth transitional parts 5*a*1, 5*a*2, 5*b*1, 5*b*2 are folded over the first to fourth ramp parts 4*a*1, 4*a*2, 4*b*1, 4*b*2 which have been turned over on the first and second intermediate parts 6*a*, 6*b* along a second folding direction opposite to the first folding direction. In another example of the present invention, firstly, one of the first and second ramp parts 4*a*1, 4*a*2 and one of the third and fourth ramp parts 4*b*1, 4*b*2 are turned by 180 degree about an longitudinal axis of the ramp device of the present invention. Secondly, the first to fourth ramp parts 4*a*1, 4*a*2, 4*b*1, 4*b*2 are folded onto the first and second intermediate parts 6*a*, 6*b* about a first folding direction. Next, the first to fourth transitional parts 5*a*1, 5*a*2, 5*b*1, 5*b*2 are folded over the first to fourth ramp parts 4*a*1, 4*a*2, 4*b*1, 4*b*2 which have been turned over on the first and second intermediate parts 6*a*, 6*b* along the first folding direction. As a result, the sloping surfaces of the first and second ramp parts 4*a*1, 4*a*2 and those of the third and fourth ramp parts 4*b*1, 4*b*2 face each other, respectively.

In such a case, the connection frame 7 can be provided in or omitted from the ramp-platform device. When the connection frame 7 is provided, the first and second intermediate parts 6*a*, 6*b* can be foldably connected with the first and second upper edges 7*a*1, 7*a*2 of the connection frame 7 by a hinge. When it is needed to be transported, firstly, the first and second intermediate parts 6*a*, 6*b* are turned over onto the top surface of the connection frame 7, and then the first to fourth ramp parts 4*a*1, 4*a*2, 4*b*1, 4*b*2 are folded over the first to fourth transitional parts 5*a*1, 5*a*2, 5*b*1, 5*b*2 in sequence. Alternatively, the first to fourth ramp parts 4*a*1, 4*a*2, 4*b*1, 4*b*2 and the first to fourth transitional parts 5*a*1, 5*a*2, 5*b*1, 5*b*2 are firstly folded over the first and second intermediate parts 6*a*, 6*b* in sequence, and then the first to fourth transitional parts 5*a*1, 5*a*2, 5*b*1, 5*b*2 are turned over onto the top surface of the connection frame 7.

In a further embodiment of the present invention, the first to fourth ramp parts 4*a*1, 4*a*2, 4*b*1, 4*b*2 and the first to fourth transitional parts 5*a*1, 5*a*2, 5*b*1, 5*b*2 are connected by means of a removable connections, such as swallow-tailed connections, respectively. On the other hand, the first to fourth transitional parts 5*a*1, 5*a*2, 5*b*1, 5*b*2 and the first and second intermediate parts 6*a*, 6*b* are connected by foldable connections, such as hinges, respectively. As such, when it is needed to be transported, firstly, the first and second intermediate parts 6*a*, 6*b* are turned over onto the top surface of the connection frame 7, and then the first to fourth transitional parts 5*a*1, 5*a*2, 5*b*1, 5*b*2 are folded over onto the first and second intermediate parts 6*a*, 6*b* along the hinges. Thereafter, the first to fourth ramp parts 4*a*1, 4*a*2, 4*b*1, 4*b*2 are detached from the ramp device and superposed on the first to fourth transitional parts 5*a*1, 5*a*2, 5*b*1, 5*b*2 which has been turned over onto the first and second intermediate parts 6*a*, 6*b*, as shown in FIG. 3.

The disassembling and folding processes of ramp-platform device 2 for the on-board relocatable small vehicle inspection system are described below with reference to FIGS. 3 and 4.

Figure 3:
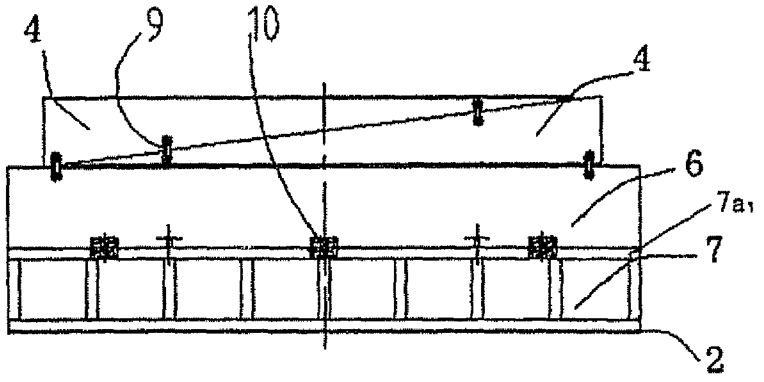
FIG. 3 is a front view of the ramp-platform device in disassembling and folding conditions according to an embodiment of the present invention.
Figure 4:
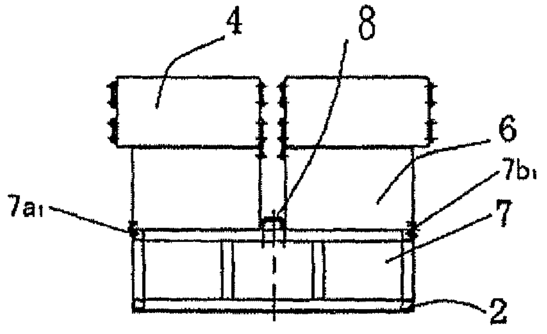
FIG. 4 is a side view of the ramp-platform device shown in FIG. 3.

As shown in FIGS. 3 and 4, when it is not in use, the connections, such as swallow-tailed connections between the first to fourth ramp parts 4*a*1, 4*a*2, 4*b*1, 4*b*2 and the first to fourth transitional parts 5*a*1, 5*a*2, 5*b*1, 5*b*2 and the connections, such as swallow-tailed connections between the first and second intermediate parts 6*a*, 6*b* and the first to fourth transitional parts 5*a*1, 5*a*2, 5*b*1, 5*b*2 are disassembled. Then, the first to fourth transitional parts 5*a*1, 5*a*2, 5*b*1, 5*b*2 are placed onto the racks of four subspaces S1-S4 within the connection frame 7 separately.

Subsequently, the first and second intermediate parts 6*a*, 6*b* are turned 180 degree about the first and second upper edges 7*a*1, 7*a*2 of the connection frame 7 and folded onto the top surface of the connection frame 7, and the disassembled first and second ramp parts 4*a*1, 4*a*2 are folded onto the first intermediate part 6*a*, and the third and fourth ramp parts 4*b*1, 4*b*2 are folded onto the second intermediate part 6*b*. However, the folding method is not limited thereto. Alternatively, the first and second ramp parts 4*a*1, 4*a*2 are folded onto the second intermediate part 6*b*, and the third and fourth ramp parts 4*b*1, 4*b*2 are folded onto the first intermediate part 6*a*.

Finally, the disassembled and folded ramp-platform device is placed onto a moving device for moving the inspection system so as to facilitate transportation.

For example, the moving device of the inspection system can be a motor vehicle such as a scanning vehicle. More particularly, the entire inspection system is integrated on the scanning vehicle so as to be movable, thus an on-board relocatable inspection system is achieved. The inspection system may move to any suitable sites so as to implement inspection as required, accordingly, it is unnecessary to set up a stationary inspection system in every site, thus the cost is greatly reduced.

It is understood that the assembling and spreading processes of the ramp-platform device 2 is in a reverse process to the disassembling and folding processes mentioned above. For the purpose of brevity, the detailed description of the disassembling and folding processes is omitted.

Preferably, in order to keep the stability of the ramp-platform device 2 in the disassembling and folding conditions, the ramp-platform device further comprises a fastener 9 for fastening the first and second intermediate parts 6*a*, 6*b* together with the first to fourth ramp parts 4*a*1, 4*a*2, 4*b*1, 4*b*2 placed thereon so as to prevent the first to fourth ramp parts 4*a*1, 4*a*2, 4*b*1, 4*b*2 from dropping from the first and second intermediate parts 6*a*, 6*b*. The fastener 9 includes but is not limited to an elastic hook.

In addition, the connection frame 7 may be provided with a suspender 8 to hoist and load the ramp-platform device 2, as described below. The suspender 8 preferably is a fly ring and provided substantially at the central of the top surface of the connection frame 7. The number and the position of the fly ring is not limited as long as the ramp-platform device 2 can be hoisted and loaded.

As described above, in an embodiment of the present invention, the ramp parts, the transitional parts, the intermediate parts 6 and the connection frame 7 are all made of Al-alloy.

Figure 6:
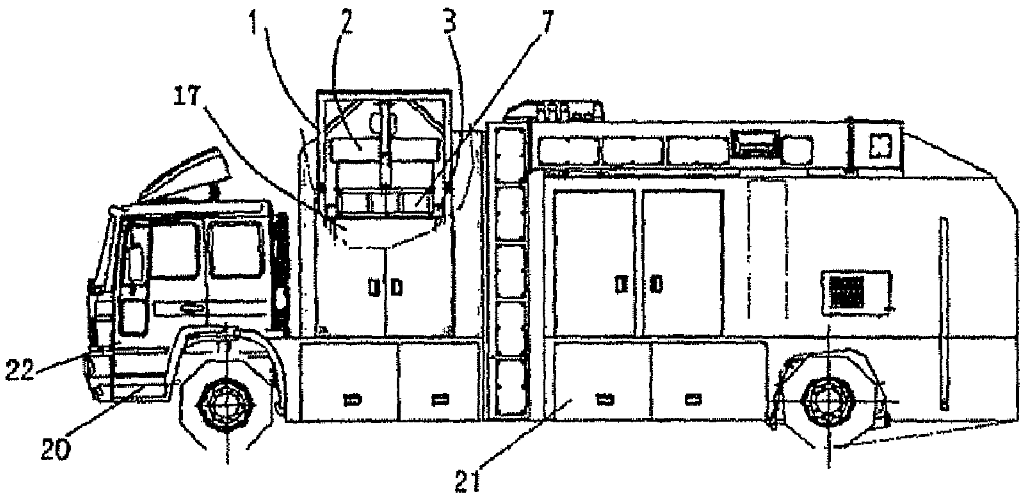
FIG. 6 is a schematic view of the ramp-platform device installed on a scanning vehicle according to an embodiment of the present invention.
Figure 7:
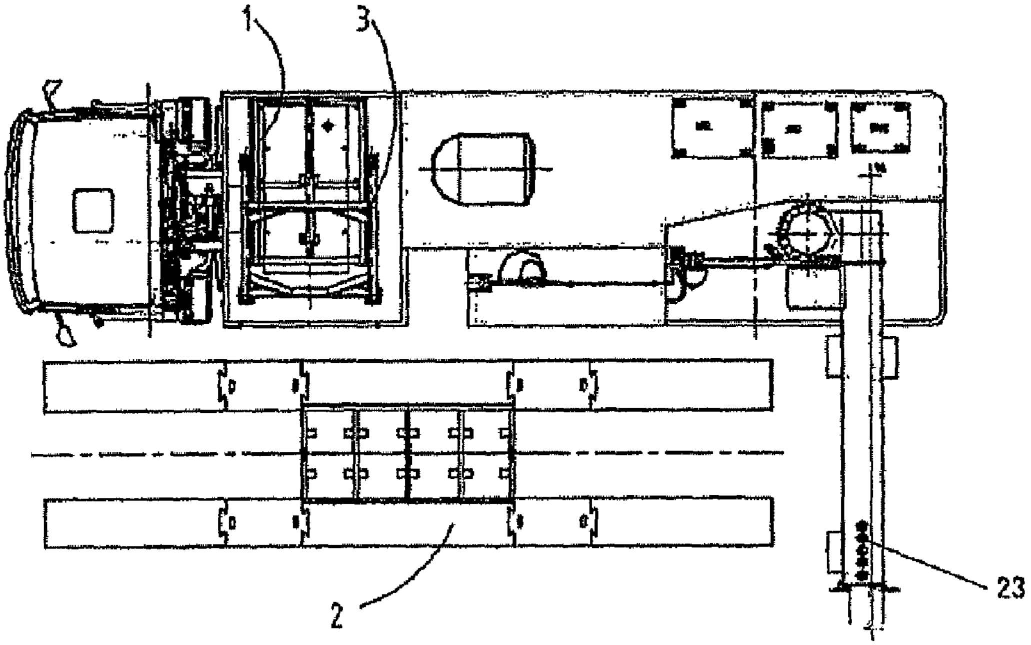
FIG. 7 is a view showing the ramp-platform being used in an inspection system operation according to an embodiment of the present invention.

Therefore, when it is in use, according to the present invention, the ramp-platform device is assembled and spread for raising the vehicle to be inspected to a higher level so as to enable inspection of every part of the small vehicle with a lower chassis, as shown in FIG. 7. When it is not in use, the ramp-platform device is disassembled and folded so as to be placed on the scanning vehicle of the inspection system. It is not only easy for transportation, but also space is saved, and it is improved in convenience of the usage, as shown in FIG. 6.

Figure 5:
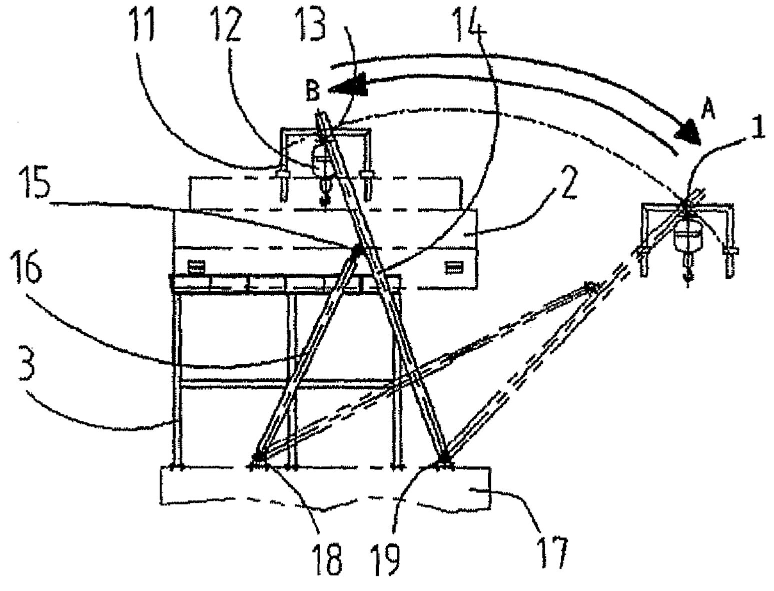
FIG. 5 is a schematic view of a hoisting device for hoisting and loading the ramp-platform device according to an embodiment of the present invention.

The application of the ramp-platform device will be further described with reference to FIGS. 5 and 6, in particularly, the movable inspection system with the ramp-platform device 2 will be described below.

As shown in FIG. 6, the on-board relocatable inspection system according to the present invention comprises a radiation source (not shown) for radiating radials, a detector array 23 for receiving the radials from the radiation source, a scanning vehicle 20, and a ramp-platform device 2. The scanning vehicle 20 is a moving device of a movable inspection system for causing the inspection system to move. The scanning vehicle 20 includes a vehicle motor 22 for which provided the power to drive and a chassis frame 21. The vehicle motor 22 and the chassis frame 21 may be either fixedly connected or removably connected. The other parts of the inspection system, which include the radiation source, the detector array and the ramp-platform device, may be disposed on the chassis frame 21. However, the moving device of the movable inspection system is not limited to the scanning vehicle 20, for example, the moving device of the inspection system may be a trailer with wheels. Each part of the inspection system may be disposed on the trailer, and the trailer may be moved by driving a motor vehicle such as automobile, truck, tractor and so on. Alternatively, the moving device also can be simplified by installing wheels under a slab.

Furthermore, as described above, the object to be inspected can be a vehicle loaded with a container having cargoes inside; however, the vehicle to be inspected also can be directly loaded with cargoes inside a sealed space provided thereon rather than a container. At the mean while, the cargoes to be inspected may be not loaded in the vehicle, but loaded on the trailer which is driven and moved by other driving mechanism, such as a winch. No matter in which condition, the application of the movable inspection system according to the present invention will not be hindered.

Furthermore, the movable inspection system includes hoisting device 1 for hoisting and loading the ramp stage device 2 onto the vehicle frame 17 of the scanning vehicle 20, and hoisting and dropping the ramp-platform device 2 from the vehicle frame 17 of the scanning vehicle 20 to, for example, the ground.

The hoisting device 1 includes a lifting device 12 for hoisting and lifting the ramp-platform device 2, a boom 14, and an actuator 16. Preferably, the lifting device 12 is an electric hoist, the actuator 16 is a hydraulic cylinder, and the boom 14 is configured to be telescopic, so that the position of the ramp-platform device 12 on the scanning vehicle 20 can be adjusted, and it is easy to hoist and load. However, those skills in the arts may understand that the lifting device 12, the boom 14 and the actuator 16 are not limited to the embodiments described above, they may be achieved by any other ways, for example, the lifting device 12 may be constituted by a pulley, a cable, and a windlass.

In detail, boom 14 has one end swingingly hinged with a first support 19 provided on the scanning vehicle 20, and the other end is connected with the electric hoist 12 as the lifting device 20. The hydraulic cylinder 16 as the actuator has one end swingingly hinged with a second support 18 provided on the scanning vehicle, and the other end is hinged with a third support 15 provided on the boom 14. Therefore, the boom 14 can swing along a first direction A and a second direction B opposite to the first direction A shown in FIG. 5 when it is driven by the hydraulic cylinder 16. The swing of the boom 14 drives the electric hoist connected at the other end of the boom 14 to swing. Therefore, when the electric hoist 12 hoists the disassembled and folded ramp device 2, the ramp-platform device 2 can be hoisted and loaded onto the scanning vehicle 20 or from the scanning vehicle 20 to the ground.

Preferably, the hoisting device further comprises a bracket 3 provided on the vehicle frame 17 of the scanning vehicle 20, and the bracket 3 is used for supporting the ramp-platform device 2 loaded onto the scanning vehicle 20.

Alternatively, the hoisting device 1 further comprises a swing stopping frame 11 for preventing the ramp-platform device from swinging; the swing stopping frame 11 is constructed as a substantially rectangular frame and defines therein an inner space with an opened bottom surface.

The other end of the boom 14 is hinged with a fourth support 13 provided on an outer top surface of the swing stopping frame 11. The electric hoist 12 is connected onto an inner top surface of the swing stopping frame 11 and located inside the inner space of the swing stopping frame 11 so as to prevent the ramp-platform device 2 from swinging up and down and/or left and right when the ramp-platform device 2 is hoisted by the electric hoist 12, so that the stability is enhanced during hoisting and loading.

It should be noted that the electric hoist 12 is still connected with the flying ring 8 on the connection frame 7 of the ramp-platform device 2 when the ramp-platform device 2 has already been hoisted and loaded onto the scanning vehicle 20. In this way, the process in which the electric hoist 12 is required to be re-hooked onto the flying ring by hooks when the ramp-platform device 2 is to be hoisted away from the scanning vehicle 20 can be avoided.

The entire working processes of the on-board relocatable small vehicle inspection system according to the present invention will be described below.

First, the scanning vehicle carrying the entire inspection system is driven to the operational site. The electric hoist 12 is activated to hoist the ramp-platform device 2 in the disassembling and folding conditions (as shown in FIG. 6) to a predetermined height, so the ramp-platform device 2 is allowed to be away from bracket 3 of the vehicle frame 17 provided on the scanning vehicle 20.

Then, a port of the scanning vehicle 20 is opened. Then, a hydraulic system is activated to supply hydraulic oils to the hydraulic cylinder 16, and a piston rod of the hydraulic cylinder 16 is extended out so as to drive the boom 4 to swing along the first direction A (the direction along which the ramp-platform device 2 is hoisted away from the scanning vehicle 20) about the first support 19. Thus, the boom 14 causes the swing stopping frame 11 together with the electronic hoist 12 and the ramp-platform device 2 to swing. At this time, the swing stopping frame 11 keeps the ramp-platform device 2 from swinging up and down and/or left and right. When the ramp-platform device 2 is hoisted away to the outside of the body of the scanning vehicle 20 and reaches to a predetermined position, the piston rod of the hydraulic cylinder 16 is stopped from extending out and the boom 14 is stopped from swinging. At this time, the electric hoist 12 is restarted and the ramp-platform device 2 is landed to the ground. It should be noted that the orientation of the ramp-platform device 2 can be adjusted according to the requirements when it is close to the ground, and then the ramp-platform device 2 is landed onto the ground.

Thereafter, the hooks of the electric hoist 12 are detached from the fly rings 8 on the connection frame 7, and the cable of the electric hoist 12 is raised. Then, the hydraulic cylinder 16 is restarted, the piston rod of the hydraulic cylinder 16 is retracted, and the boom 14 swings about the first support 19 along a second direction B opposite to the first direction A.

Next, the elastic hook 9 fastening the first and second intermediate parts **6*a*, 6*b* and the fourth ramp parts 4*a*1, 4*a*2, 4*b*1, 4*b*2 is detached or removed, and the first to fourth ramp parts 4*a*1, 4*a*2, 4*b*1, 4*b*2 are moved from the first and second intermediate parts 6*a*, 6*b*** separately.

And then, the first and second intermediate parts **6*a*, 6*b* are turned over from the upper surface of the connection frame 7 around the first and second upper edges 7*a*1, 7*b*1 of the connection frame 7, respectively. The first to fourth transitional parts 5a1, 5a2, 5b1, 5b2 are taken out from the inner spaces S of the connection frame 7 and connected to the first and second intermediate parts 6a, 6b, separately. And then, as shown in FIG. 7, the first to fourth ramp parts 4a1, 4a2, 4b1, 4b2 are connected to the first to fourth transitional parts 5a1, 5a2, 5b1, 5b2, separately, so that the ramp-platform device 2** is brought into its assembling and spreading conditions.

Then, a small vehicle with a lower chassis to be inspected is driven onto the ramp-platform device, so that the vehicle to be inspected can be inspected by radiation imaging, the height of the vehicle to be inspected can be raised due to the ramp-platform device 2, so that the chassis and wheels of the vehicle to be inspected can be inspected without reducing the height of the radiation source or the like.

After usage, the ramp-platform device 2 is disassembled and folded, and the process of hoisting the ramp-platform device 2 to the bracket 3 on the scanning vehicle 20 is reverse to the process described above, the detailed explanation is omitted for the purpose of brevity.

Although a few embodiments of the present invention have been shown and described, it would be appreciated by those skilled in the art that changes may be made in this embodiment without departing from the principles and the spirit of the invention, the scope of which is defined in the claims and their equivalents.

What the claim is:

1. A relocatable vehicle inspection system, comprising:

a radiation source for radiating radials;

a detection array for receiving the radials from the radiation source, so that an image of the cargo on the vehicle to be inspected may be obtained;

a moving device on which the radiation source and the detection array are disposed; and a ramp-platform device, comprising:

first and second intermediate parts, said first and second intermediate parts are disposed in parallel with each other; and first, second, third and fourth ramp parts with a substantially triangle shaped longitudinal section;

first, second, third and fourth transitional parts, each of said first, second, third and fourth transitional parts has a sloping portion and a horizontal portion, the gradient of the sloping portion is equal to that of the first, second, third and fourth ramp parts, and the height of a bottom end of the sloping portion is substantially equal to the height of the top end of the first, second, third and fourth ramp parts, and the height of the horizontal portion is substantially equal to that of the first and second intermediate parts; top ends of the first, second, third, fourth ramp parts can be foldably or removably connected to the sloping portions of the first, second, third, fourth transitional parts, respectively, the first and second transitional parts can be foldably or removably connected to the first intermediate part, and the third and fourth transitional parts can be foldably or removably connected to the second intermediate part, further comprising a connection frame having a substantially rectangular shape, wherein, the first and second intermediate parts are provided on a first side and a second side of the connection frame in opposite to each other, respectively, wherein said ramp-platform device can be placed onto or removed away from the moving device under disassembling and folding conditions.

2. The relocatable vehicle inspection system of claim 1, further comprising a hoisting device provided on the moving device, for hoisting and loading the ramp-platform device onto or removing it away from the moving device.

3. The relocatable vehicle inspection system of claim 2, wherein the hoisting device comprising:

a lifting device for hoisting and lifting the ramp-platform device;

a boom having one end hinged with a first support provided on the moving device and another end connected with the lifting device;

an actuator having one end hinged with a second support provided on the moving device and another end hinged with a third support for driving the boom to swing, so that the ramp-platform device in the disassembling and folding conditions can be hoisted and loaded onto or removed from the moving inspection system.

4. The relocatable vehicle inspection system of claim 3, wherein the hoisting device further comprising a swing stopping frame for preventing the swing of the ramp-platform device when it is being hoisted, the lifting device is installed inside the swing stopping frame, and the boom is hinged with a fourth support provided at an outer top surface of the swing preventing frame.

5. The relocatable vehicle inspection system of claim 4, wherein said lifting device comprises an electric hoist.

6. The relocatable vehicle inspection system of 1, wherein said actuator comprises a hydraulic cylinder.

7. The relocatable vehicle inspection system of claim 6, wherein said boom is configured to be telescopic.

8. The relocatable vehicle inspection system of claim 7, wherein said boom also includes a bracket provided on the moving device for supporting the ramp-platform device.

9. The relocatable vehicle inspection system of claim 8, wherein said moving device includes a vehicle motor for providing power and a chassis frame connected with the vehicle motor, wherein the radiation source, the detection array, and the hoisting device are disposed on the chassis frame, and said ramp-platform device can be placed onto and removed from the chassis frame by the hoisting device in the disassembling and folding conditions.

10. The relocatable vehicle inspection system of claim 8, wherein the moving device comprises a trailer.

* * * * *